United States Patent
Wallenius

(10) Patent No.: US 6,760,417 B1
(45) Date of Patent: Jul. 6, 2004

(54) CHARGING METHOD IN TELECOMMUNICATIONS NETWORK

(75) Inventor: Jukka Wallenius, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/807,825

(22) PCT Filed: Oct. 18, 1999

(86) PCT No.: PCT/FI99/00858

§ 371 (c)(1),
(2), (4) Date: Aug. 30, 2001

(87) PCT Pub. No.: WO00/24161

PCT Pub. Date: Apr. 27, 2000

(30) Foreign Application Priority Data

Oct. 19, 1998 (FI) .................................................. 982263
Dec. 18, 1998 (FI) .................................................. 982748

(51) Int. Cl.[7] ............................................ H04M 15/00
(52) U.S. Cl. ............................ 379/114.28; 379/114.03; 379/114.29; 370/353; 370/355; 455/406; 455/432
(58) Field of Search ........................ 379/114.01, 114.03, 379/114.2, 114.28, 115.01, 121.01, 121.05, 126, 230, 114.29, 121.03; 455/405, 406, 432, 433; 370/352, 353, 355

(56) References Cited

U.S. PATENT DOCUMENTS

| | | | | |
|---|---|---|---|---|
| 5,517,555 A | * | 5/1996 | Amadon et al. | 379/59 |
| 5,732,127 A | * | 3/1998 | Hayes | 379/115 |
| 5,995,822 A | * | 11/1999 | Smith et al. | 455/406 |
| 6,044,259 A | * | 3/2000 | Hentila et al. | 455/406 |
| 6,075,855 A | * | 6/2000 | Christiansen et al. | 379/221 |
| 6,188,752 B1 | * | 2/2001 | Lesley | 379/114.16 |
| 6,249,572 B1 | * | 6/2001 | Brockman et al. | 379/133 |
| 6,333,976 B2 | * | 12/2001 | Lesley | 379/114.01 |
| 6,363,144 B1 | * | 3/2002 | Becher et al. | 379/211.01 |
| 6,373,930 B1 | * | 4/2002 | McConnell et al. | 379/114.28 |
| 6,393,269 B1 | * | 5/2002 | Hartmaier et al. | 455/406 |
| 6,430,406 B1 | * | 8/2002 | Frisk | 455/407 |
| 6,442,267 B2 | * | 8/2002 | Culli et al. | 379/220.01 |

FOREIGN PATENT DOCUMENTS

| | | |
|---|---|---|
| DE | 44 19 651 | 12/1995 |
| FI | 102232 | 7/1997 |
| WO | WO 95/22230 | 8/1995 |
| WO | WO 96/15616 | 5/1996 |
| WO | WO 96/36192 | 11/1996 |
| WO | WO 97/23100 | 6/1997 |
| WO | WO 97/26739 | 7/1997 |
| WO | WO 97/30543 | 8/1997 |

* cited by examiner

Primary Examiner—Binh Tieu
(74) Attorney, Agent, or Firm—Pillsbury Winthrop LLP

(57) ABSTRACT

A method and system for charging a subscriber (10) in a telecommunications network comprising nodes (11 and 12) connected to a mediator unit (14), whereby a billing unit (15) comprising the subscriber's (10) charging data can be located outside the network used, preferably in the subscriber's (10) home network, in a subscriber identity module (SIM) or behind an open service architecture (OSA) associated with the network, the method comprising the following steps of: noting in the nodes (11 and 12) the event data related to the services used by the subscriber (10) and reporting the event data to the mediator unit (14), the event data being converted substantially in real time in the mediator unit (14) by applying the network charging algorithms to provide a charging data format understandable to the billing unit (15), expressed preferably as an amount of money spent or as charging pulses, for the updating of the subscriber's (10) charging data between the mediator unit (14) and the billing unit (15).

34 Claims, 1 Drawing Sheet

CHARGING METHOD IN TELECOMMUNICATIONS NETWORK

This application is the National Phase of International Application PCT/FI99/00858 filed Oct. 18, 1999 which designated the U.S. and that International Application was Published under PCT article 21(2) in English.

BACKGROUND OF THE INVENTION

The invention relates to charging in a telecommunications network and particularly to real-time charging of prepaid services.

The GPRS (General Packet Radio Service) is a new service in the GSM system and one of the objects of the standardization work in the GSM phase 2+ at the ETSI (European Telecommunication Standard Institute). The GPRS operational environment comprises one or more subnetwork service areas interconnected by a GPRS Backbone Network. A subnetwork comprises a number of packet data service nodes, referred to as GPRS support nodes, each of which is connected to the GSM mobile network in such a way that it can provide a packet service for mobile data terminals via several base stations, i.e. cells. The intermediate mobile communications network provides circuit-switched or packet-switched data transmission between a support node and mobile data terminals. Different subnetworks are in turn connected to an external data network, to a public switched packet data network PSPDN, for example. The GPRS service thus allows packet data transmission to be provided between mobile data terminals and external data networks, with the GSM network serving as an access network.

In the GPRS system, charging is based on a plural number of charging records CDR generated at the support nodes, the records being transmitted to a charging gateway functionality CGF. From the data it receives, the charging gateway functionality filters the charging data and transmits the filtered charging records CDR to a billing system that generates the actual charging data. A problem with the above described arrangement is that the generating of the charging data is relatively slow. In particular, when a subscriber uses what are known as prepaid services, charging should take place substantially in real-time to avoid a situation where the subscriber could continue to use the prepaid service even though the amount paid in advance by the subscriber had already been exhausted. One solution to the problem is to send the filtered charging data directly from the charging gateway functionality to the billing unit. The term 'billing unit' in this context refers generally to a functional unit that maintains the subscriber's charging data, or account data, and also comprises, for example, information about the advance payments made by the subscriber for the prepaid services. Alternatively, also data about the GPRS context events could be sent from the support nodes to the billing unit, charging being then based on the context events. In the above cases, problems arise, on one hand, from the complexity and amount of data received from the support nodes and, on the-other hand, from network-specific charging methods that may differ from one another. Charging can be based, for example, on the duration of the service, on the amount of data to be transferred, or on other similar criteria. If the subscriber uses a foreign network, the billing unit must know the charging algorithms of the network concerned; this renders the billing unit configuration complex. Similar problems can also arise in a circuit-switched network, such as the GSM network, and in broadband networks. In the GSM system, for example, different events taking place during a call can have a different impact on charging, depending on the operator, or they may have no impact at all. Such events include quality of service changes, transmission rate changes, location changes, temporary entry into a shadow region, temporary cutting off of the subscriber connection, and changes during an ongoing call in the services used.

BRIEF DESCRIPTION OF THE INVENTION

An object of the invention is therefore to provide a method and a system implementing the method in such a way that the above problems can be solved. The objects of the inventions are achieved with a method and system characterized by what is stated in the independent claims 1 and 11. The preferred embodiments of the invention are disclosed in the dependent claims.

The invention is based on the idea of providing telecommunications network nodes with a function that converts event data or charging data received from the nodes, by applying the network charging algorithms, to provide a real-time, unambiguous charging data format understandable to the subscriber's billing unit, expressed as an amount of money spent or as charging pulses, for example. A node in this context refers to a network element, such as a packet network support node GSN or a mobile services switching centre MSC, that provides event data having an impact on charging. Unambiguity means that the charging data are structurally identical in the different telecommunications networks, irrespective of the internal charging algorithms of the networks. The unambiguous charging data are further transmitted to the subscriber's billing unit that maintains in real-time the subscriber's charging data. The function associated with the network nodes can also negotiate with the subscriber's billing unit about charging; for example, the billing unit provides a predetermined amount of the prepaid sum for use to the function associated with the nodes of the network used and when the amount is exhausted, the function can request an additional payment for use.

The method and system of the invention provide the advantage that the subscriber's charging data can be updated in a real-time process, thus allowing prepaid services to be used. In addition, the invention allows this irrespective of the network used, the charging data of a visiting subscriber thus being also updated substantially in real-time in the home network or a subscriber identity module, for example. The billing unit only needs to know one common charging data structure; each function integrated into the support nodes of a telecommunications network knows the corresponding charging algorithm of the network. Another advantage of the invention is the possibility to optimize the amount of signalling related to the charging data because data on all separate events having an impact on the call rate do not need to be transmitted all the way to the billing unit.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Although the use of the invention will be described below with reference to the GPRS and GSM systems, the description does not in any way restrict the application of the invention in other telecommunications networks.

Figure 1:
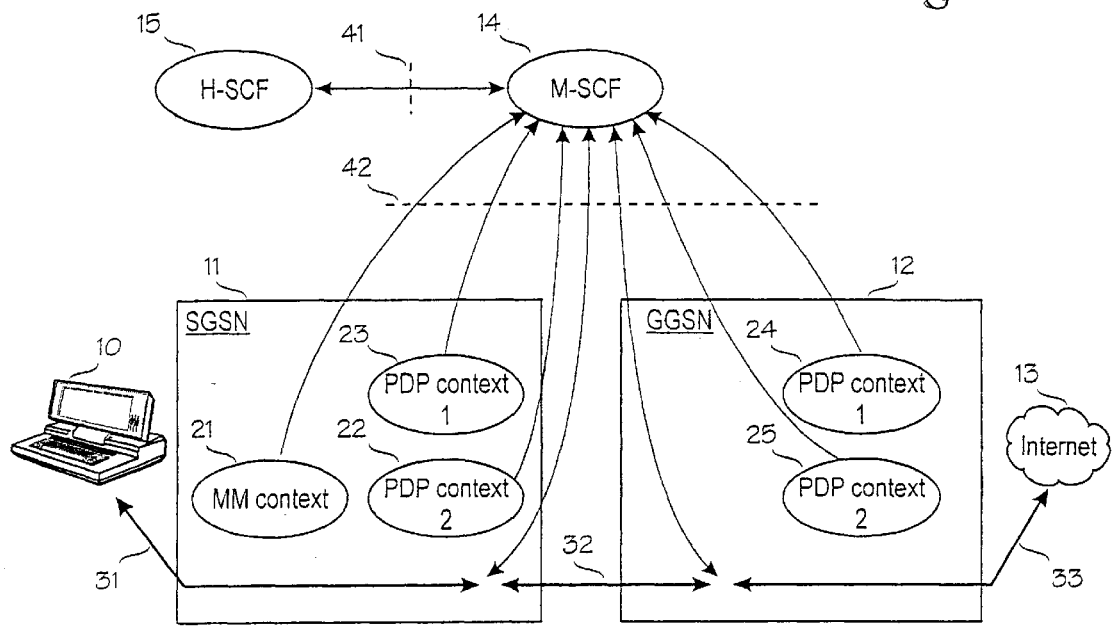
FIG. 1 is a block diagram illustrating a system of the invention for carrying out charging in a packet-switched telecommunications network according to a preferred embodiment.

FIG. 1 illustrates a typical arrangement in a GPRS network. It is to be understood, however, that the Figure only shows components relevant to the invention. The architecture of GPRS networks is not as mature as that of the GSM networks. All GPRS terms should therefore be understood as being descriptive rather than limiting. The arrangement in the Figure comprises a separate Serving GPRS Support Node (SGSN) 11 of the GPRS. The support node 11 controls certain operations of the packet radio service on the network side. The operations include logging on and off the system by subscribers 10, routing area updates of the subscribers 10, and data packet routing to correct destinations.

The intermediate mobile network (not shown) provides packet-switched data transmission 31 between the support node 11 and the mobile subscribers 10. Different sub-networks, in turn, are connected 33 to an external data network 13, such as the Internet, via a specific Gateway GPRS Support Node GGSN 12. Packet data transmission between the mobile subscriber 10 and the external data networks 13 is thus accomplished by means of the GPRS service, with the GSM network functioning as an access network. The GGSN comprises, for example, routing information of GPRS subscribers, i.e. SGSN addresses and charging data. The SGSN and GGSN functionalities can be integrated into one and the same physical node.

The GPRS network of FIG. 1 comprises one serving GPRS support node SGSN (11) and one GPRS gateway support node GGSN (12). The different support nodes SGSN (11) and GGSN (12) are interconnected 32 via an intra-operator backbone network. It is to be understood that a GPRS network may comprise any number of support nodes 11 and gateway support nodes 12.

Each support node 11 manages a packet data service in the area of one or more cells in a cellular packet radio network. To achieve this, each support node 11 is connected to a certain local part of the GSM system (not shown in FIG. 1), typically to a mobile services switching centre, but in some situations it may be preferable to connect it directly to a base station subsystem BSS, i.e. to a base station controller BSC or a base station BTS. A subscriber 10 in a cell communicates with a base station BTS over a radio interface and further through the mobile network with the support node 11 to the service area of which the cell belongs. In principle, the mobile network between the support node 11 and the subscriber 10 only transmits 31 packets between these two. For this purpose, the mobile network can offer either a circuit-switched connection or packet-switched data packet transmission between the subscriber 10 and the serving support node 11. It should be noted, however, that the mobile network only provides a physical connection between the subscriber 10 and the support node 11, and that its exact operation and structure are not relevant to the invention. The connection 31 between the subscriber 10 and the support node 11 can also be a fixed one.

An intelligent network IN is a network architecture connected to the basic network (the GPRS, for example), enabling faster, easier and more flexible service implementation and service control. This is performed by transferring the service control from the telephone exchange to a separate functional unit of the intelligent network. The services thus become independent of the basic network operation, and the basic network structure and software do not have to be changed when services are altered or added. In addition to the actual network operator, an intelligent network may comprise several service providers.

In fixed networks, intelligent network standardization has progressed rapidly in recent years. These standards define a certain functional and hierarchical model for the intelligent network. In the intelligent network model, service control has been transferred from the exchange of the basic network to a service control point (SCP) in the intelligent network. The SCP comprises the required database and service logic programs (SLP), in other words the software to provide the logic structure of a particular service (service logic), i.e. the service control point SCP provides a service control function (SCF). A service switching point (SSP) is an exchange, for instance a basic network exchange providing the service switching function (SSF), in other words the identification of the intelligence network service and the triggering of interaction with the service control point (SCP). For example, when a call associated with an intelligent network service is set up, the service switching point SSP takes care of establishing the connection. To provide the intelligent network service, the service switching point SSP inquires instructions of the service control point SCP when encountering detection points associated with intelligent network services. In other words, the service switching point SSP transfers the control to the SCP and remains waiting for the SCP's operations. When the intelligent network service is triggered, a service logic program SLP is initiated at the service control point SCP, the operation of the program determining the instructions the SCP sends to the SSP at each call stage. The SSP interprets the instructions it receives and initiates the required call control operations. In other words, the triggering of an intelligent network service means that an intelligent network service function is initiated by the impact of an impulse caused when a specific identification requirement is met.

One way to integrate intelligent network functions into the GPRS network is to arrange the nodes SGSN (11) and GGSN (12) of the GPRS system to function as intelligent network switching points SSP. A switching point SSP provides the service switching function SSF. The service control point SCP, or a similar physical entity, providing the service control function SCF 14 and 15 is usually a separate functional unit.

Intelligent network components are interconnected via a signalling network conforming to the signalling system number 7 (SS7, Signalling System Number 7 is a well-known signalling system described in the recommendations of the CCITT (now the ITU-T)). When communicating with each other, intelligent network components use, for example, the INAP protocol (Intelligent Network. Application Protocol described in the ETSI (European Telecommunications Institute) standard ETSI IN CS1 INAP Part 1: Protocol Specification, prETS 300 374-1). In the SS7 protocol stack the INAP layer is the topmost layer, situated on top of a TCAP layer (Transaction Capabilities Application Part), an SCCP layer (Signalling Connection Control Point) and an MTP layer (Message Transfer Part). In the GSM and the GPRS, components communicate using for example a CAP protocol GSM 09.78 or a MAP protocol GSM 09.02.

When the subscriber 10 registers in the GPRS network, i.e. in a GPRS attach procedure, the SGSN 11 creates a mobility management context (MM context) 21 containing information related to the mobility and security of the subscriber 10, for example. In connection with a PDP activation procedure the SGSN 11 creates a PDP context (packet data protocol), 22 and 23 to be used for routing purposes, with the GGSN 12 used by the GPRS subscriber 10, within the GPRS network. The PDP context determines different data transmission parameters, such as PDP type (X.25 or IP, for example), PDP address (X.121 address, for example), Quality of Service QoS and NSAPI.

The GPRS gateway support node GGSN 12 connects the GPRS network to the data networks 13, such as an IP network (the Internet). The GGSN 12 includes the PDP addresses and routing information, i.e. the PDP contexts 24 and 25, of the GPRS subscribers 10. The routing information is used for tunneling protocol data units PDU from the data network 13 to the current switching point of the subscriber 10, i.e. to the serving SGSN 11.

According to the method of the invention, an intelligent network service control function (M-SCF) 14 or another similar mediator unit function is connected to the packet network nodes 11 and 12. From the support nodes 11 and 12 information about different context events 21 to 25 related to the services used by the subscriber 10 is submitted to the mediator unit 14. In an intelligent network application the information provides the service control function SCF with impulses triggering the service. The mediator unit 14 converts in real time the information received from the MM and PDP contexts 21 to 25 by applying the charging algorithms of the network to provide unambiguous charging data expressed as an amount of money spent or as charging pulses, for example. The network-specific charging algorithms may be based, for example, on the duration of the service used, the amount of data transferred and the quality of service, In addition, the charging algorithm may be subscriber-specific, in which case it can be loaded to the mediator unit 14, at 15 when necessary, from the home network of the subscriber 10 in connection with location updating, for example. The subscriber-specific charging algorithm can also exchange information with the charging algorithm of a visited network or with another corresponding service responsible for the determining of mediator unit charging. The determining of the charging of a connection established to a selected number, for example, can be advantageously left at the mediator unit's responsibility because the visited network knows the charging principles of the addresses in its area, for example. Alternatively, if the packet network is provided with a charging gateway functionality CGF (not shown), the mediator unit 14 is advantageously located in association with the CGF; it thus receives the CDR data coming from the support nodes 11 and 12 and filtered by the CGF. Also in this case the mediator unit 14 converts in real time the information it receives by applying the charging algorithms of the network to provide unambiguous charging data, expressed as an amount of money spent or as charging pulses, for example.

The charging data are forwarded to the subscriber billing entity 15, which is advantageously an intelligent network service control function (H-SCF). The billing unit 15 is located, for example, in the home network of the subscriber 10, in a subscriber identity module (SIM), or in another similar location determined on the basis of subscriber identity. The billing unit 15 can also be located behind an open service architecture (OSA) associated with the GPRS, GSM or UMTS (Universal Mobile Telecommunications System), whereas the mediator unit 14 is located within the area of a GPRS, GSM or UMTS network, preferably in a CSE (Camel Service Environment) of the home network. The open service architecture provides an entity-based interface for service features that are used for providing services. The open service architecture can be provided either from the CSE or from a server communicating with the CSE for the purpose of providing service features. To implement the service features provided by the open service architecture within the network, the network support nodes are controlled by applying network-specific operations (such as CAP, INAP, MAP, ISUP) typically from the CSE, for example. The open service architecture is defined in the ETSI UMTS recommendation 23.20. The billing unit 15 comprises the account data of the subscriber 10 and it updates the data in real time on the basis of the information it receives from the mediator unit 14. Since the billing unit 15 receives the charging data in an unambiguous form, it does not need to know the charging algorithms of the different packet networks that the subscriber 10 possibly visits.

For prepaid services the billing unit 15 comprises a particular prepayment account into which the subscriber 10 can make a prepayment. The billing unit 15 debits the prepayment account, on the basis of the information it has received from the mediator unit 14, with the amount of the prepaid services used by the subscriber 10. If the amount of money in the prepayment account has been exhausted, the billing unit 15 informs this to the packet network which prevents the subscriber from using the services for example by deactivating the contexts 21 to 25 of the subscriber 10 in the support nodes 11 and 12.

In another alternative for performing charging when prepaid services are used the mediator unit 14 requests the billing unit 15 to place a predetermined amount of the money in the prepayment account at its disposal and from the sum it receives, the mediator unit 14 then subtracts the amount corresponding to the services used by the subscriber 10. If the subscriber stops using a service, thereby deactivating for example the MM or PDP context 21 to 25, the corresponding amount of money that is left is transferred back into the prepayment account at the billing unit 15. On the other hand, if the amount of money transferred to the mediator unit 14 is exhausted, the mediator unit 14 requests a new sum from the billing unit 15. If the prepayment account at the billing unit 15 is exhausted, and a new sum cannot be transferred from the billing unit 15 to the mediator unit 14, the subscriber 10 is prevented from using the services.

When prepaid services are charged for, a certain amount of credit may also be accepted. In this case the subscriber 10 can use the services even after the prepayment has been exhausted.

In a preferred embodiment of the invention a first context event fulfilling the trigger conditions and associated with a session of the subscriber 10 or with a particular context 21 to 25 of a session of the subscriber 10 triggers the intelligent network service in the service control function 14 acting as the mediator unit function. The service control function 14 acting as the mediator unit function determines the charging algorithm to be applied. The charging algorithm provides the context events that are significant for charging. After the charging algorithm has been determined the mediator unit function 14 informs the support node 11 or 12 the context events it is interested in and requests a report of the events. The report is recurrently provided on the events concerned in association with one and the same session or context 21 to 25, without a separate request, for as long as the context 21 to 25 or the session is active. In another preferred embodiment of the invention the mediator unit function 14 triggers an intelligent network service in the billing entity 15 when a first intelligent network service of a particular subscriber 10 at a particular moment is triggered in the mediator unit function by a context event. The intelligent network service initiated in the billing entity 15 as a result of the triggering then checks the account of the subscriber 10 and if there is no money left in the account, it deactivates the context 21 to 25 that performed the triggering and prevents the generating of new contexts 21 to 25.

In another preferred embodiment of the invention, the context 21 to 25 that performed the triggering is deactivated by submitting a deactivation request from the service control function 15 to the support node 11 or 12, either via the mediator unit function 14 or directly. In yet another preferred embodiment of the invention the context 21 to 25 that performed the triggering is deactivated and the activation of new contexts is prevented by submitting a request for the deactivation of the contexts 21 to 25 to the home location register (HLR, not shown), the contexts 21 to 25 then being deactivated and the activation of new contexts prevented via the HLR in accordance with GPRS recommendations.

In another preferred embodiment of the invention the billing entity 15 submits part of the sum prepaid by the subscriber 10 to the mediator unit function 14 when an intelligent network service associated with the subscriber 10 in question is triggered in the billing entity function.

According to yet another preferred embodiment of the invention, an IP protocol stack (Internet Protocol) is used at an interface 42 between the mediator unit 14 and the support node 11 and 12, and an SS7 protocol stack at an interface 41 between the mediator unit 14 and the billing unit 15. The interface 42 between the mediator unit 14 and the support node 11 and 12 is advantageously based on CORBA architecture (Common Object Request Broker Architecture) or on another entity-based distributed architecture. CORBA is an architecture defined by Object Management Group. To put it simply, CORBA allows applications to communicate with each other irrespective of where the applications are located or who designed them. It is an architecture that provides a rough basis for open environments based on standards and capable of growing as the operator's requirements increase.

Figure 2:
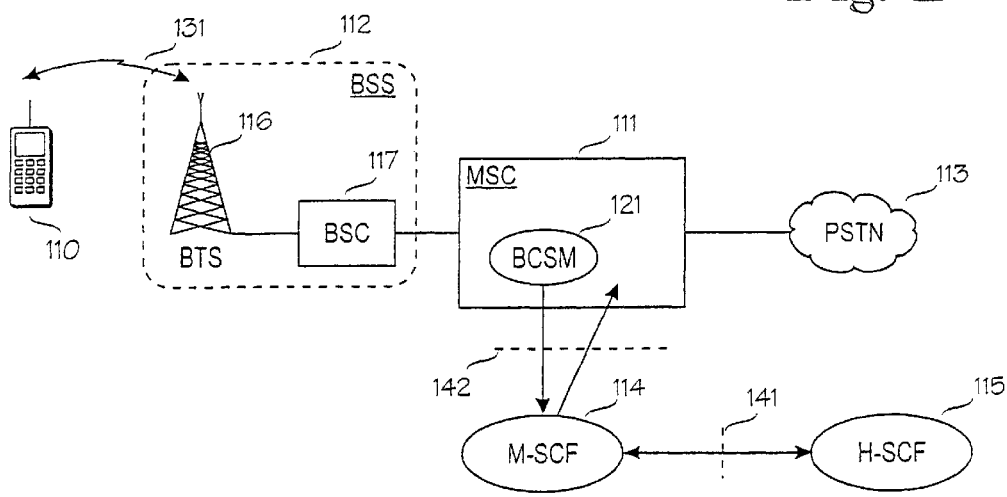
FIG. 2 is a block diagram illustrating a system of the invention for carrying out charging in a circuit-switched telecommunications network according to a preferred embodiment.

FIG. 2 shows the operation of the invention in a circuit-switched GSM mobile communication network. It is apparent that the circuit-switched network can also be implemented by using fixed connections, for example. The network comprises a base station subsystem (BSS) 112. The BSS 112 and subscribers 110 communicate over radio connections 131. In the base station subsystem 112 each cell is served by a base station (BTS) 116. A number of base stations 116 are connected to a base station controller (BSC) 117, the function of which is to control radio frequencies and channels used by the BTS 116. The BSC 117 is connected to a mobile services switching centre (MSC) 111. The MSC in turn is connected to other telecommunications networks, such as the public telephone network (PSTN) 113. The Figure only shows network elements that are necessary for the understanding of the invention. The number of network elements may be arbitrary. 30 The operation of the invention in a circuit-switched network basically corresponds to the above described operation of the invention in a packet-switched network. The network element, or node, corresponding to the support node 11 and 12 and providing event data for charging is the mobile services switching centre (MSC) 111, for example. The mobile services switching centre 111 comprises a basic call state model (BCSM) 121, which describes the different phases of call control. The mobile services switching centre 111 is advantageously associated with an intelligent network switching point SSP, the data related to a session of a subscriber 110 or to a particular state model 121 of a session of the subscriber 110 then providing impulses for the service control function SCF and triggering the intelligent network service in the service control function 114 acting as the mediator unit function. The operation of the mediator unit 114 corresponds to that of the mediator unit 14 described in connection with the packet-switched network. Similarly, the operation of a billing unit 115 corresponds to that of the billing unit 15 described above in connection with the packet network. According to a preferred embodiment of the invention, an IP protocol stack (Internet Protocol) is used at an interface 142 between the mediator unit 114 and the node 111 and, further, an SS7 protocol stack at an interface 141 between the mediator unit 114 and the billing unit 115. The interface 142 between the mediator unit 114 and the node 111 is advantageously based on the CORBA architecture or on another entity-based, distributed architecture.

The mediator unit 114 can be located in the node 111, or as a separate unit. Several mediator units may be used: for example, when a call is transmitted via several nodes 111, a separate mediator unit 114 is provided for each node 111 or, alternatively, several nodes 111 use one and the same mediator unit 114. A plurality of nodes 111 may be associated with a call of the subscriber 110 when the subscriber 110 moves within a visited network area, for example, where the subscriber 110 is served by a visited network centre VMSC (not shown), which comprises a mobile services switching centre MSC and a visitor location register VLR (VMSC=VLR+MSC), the call being forwarded from the VMSC to a gateway mobile services switching centre GMSC (not shown) which is connected to other telecommunications networks, such as the public telephone network PSTN, and which comprises gateway functionality for calls entering and leaving the networks.

It is apparent to a person skilled in the art that as technology advances the basic idea of the invention can be implemented in various different ways. The invention and its embodiments are therefore not limited to the above described examples, but they may vary within the scope of the claims.

What is claimed is:

1. A method for charging a subscriber in a visited telecommunications network being other than a home network of the subscriber, the visited network comprising nodes connected to a mediator unit, whereby a billing unit comprising the subscriber's charging data is located outside the visited network, the method comprising:

noting in telecommunications network nodes, event data associated with a service associated with the subscriber;

reporting the event data to the mediator unit;

determining in the mediator unit a network-specific charging algorithm corresponding to the visiting network; and converting, in real time, the event data in the mediator unit using the determined network-specific charging algorithm to provide a charging data format understandable to the billing unit, for updating of charging data associated with the subscriber between the mediator unit and the billing unit.

2. The method of claim 1, wherein the network charging algorithm used in the mediator unit is subscriber-specific.

3. The method of claim 1, wherein a location of the mediator unit is associated with a charging gateway functionality, via which the event data is transferred to the mediator unit.

4. The method of claim 1, wherein the mediator unit is implemented by using an intelligent network service control function associated with the telecommunications network nodes and the reported event data act as service triggers or the reported event data are reported in response to a request of the service control function.

5. The method of claim 1, wherein the billing unit is implemented using an intelligent network service control function and the mediator unit triggers the service.

6. The method of claim 1, wherein the charging data is transferred from the mediator unit to the billing unit to update the charging data.

7. The method of claim 6, wherein if the service associated with the subscriber is a prepaid service and the billing unit includes prepayment account data associated with the subscriber, a sum corresponding to the charging data transferred to the billing unit is subtracted from the prepayment account at the billing unit and the service associated with the subscriber is terminated when the prepayment account balance is zero or negative.

8. The method of claim 1, wherein if the service associated with the subscriber is a prepaid service and the billing unit includes data indicating a prepayment account associated with the subscriber, a predetermined amount of the prepayment account is transferred from the billing unit to the mediator unit, and, in the mediator unit, a sum corresponding to the charging data is subtracted from the transferred predetermined amount.

9. The method of claim 8, wherein when the subscriber stops using the service, the transferred predetermined amount remaining in the mediator unit is transferred back to the prepayment account at the billing unit.

10. The method of claim 8, wherein when the transferred predetermined amount remaining in the mediator unit is exhausted, a new amount is transferred from the prepayment account at the billing unit to the mediator unit, or the service associated with the subscriber is terminated if the prepayment account balance at the billing unit is zero or negative.

11. The method of claim 1, wherein the charging data format is expressed as an amount of money spent or as charging pulses.

12. The method of claim 1, wherein the billing unit comprising the subscriber's charging data is located in the subscriber's home network.

13. The method of claim 1, wherein the billing unit comprising the subscriber's charging data is located in a subscriber identity module.

14. The method of claim 1, wherein the billing unit comprising the subscriber's charging data is located behind an open service architecture connected to the network.

15. A billing system for charging a subscriber visiting in a visited telecommunications network other than a home network of the subscriber, the system comprising:
- a billing unit which comprises charging data associated with the subscriber and which is located outside the visited network;
- a mediator unit;
- a telecommunications network comprising nodes, the nodes being configured to generate event data associated with a service associated with the subscriber and to report the event data to the mediator unit; and
wherein the mediator unit is configured to determine a network-specific charging algorithm corresponding to the visited network and to convert, in real time, the generated event data using the determined network-specific charging algorithm into a charging data format understandable to the billing unit for the updating of the charging data associated with the subscriber between the mediator unit and the billing unit.

16. The system of claim 15, wherein the network charging algorithm associated with the mediator unit is subscriber-specific.

17. The system of claim 15, wherein the location of the mediator unit is associated with a charging gateway functionality, via which the event data is transferred to the mediator unit.

18. The system of claim 15, wherein the mediator unit is located in a Camel Service Environment of a home network associated with the subscriber and a location of the billing unit is associated with an open service architecture associated with the network.

19. The system of claim 15, wherein the mediator unit is implemented using an intelligent network service control function associated with the telecommunications network nodes and the reported event data act as service triggers or the reported event data are reported at the request of the service control function.

20. The system of claim 19, wherein an IP protocol stack is associated with an interface between the mediator unit and the telecommunication network nodes.

21. The system of claim 20, wherein the interface between the mediator unit and the telecommunication network nodes is based on Common Object Request Broker Architecture.

22. The system of claim 15, wherein the billing unit is implemented using an intelligent network service control function, the mediator unit triggering the service.

23. The system of claim 22, wherein a Signalling System Number 7 protocol stack is associated with an interface between the mediator unit and the billing unit.

24. The system of claim 15, wherein the mediator unit is configured to transfer the charging data corresponding to a service associated with the subscriber to the billing unit for the updating of the charging data associated with the subscriber.

25. The system of claim 24, wherein if the service associated with the subscriber is a prepaid service and the billing unit includes data indicating a prepayment account associated with the subscriber, and the system is configured to subtract from the prepayment account a sum corresponding to the charging data transferred to the billing unit and to terminate the service associated with the subscriber when the prepayment account balance is zero or negative.

26. The system of claim 15, wherein if a service associated with the subscriber is a prepaid service and the billing unit includes data indicating a prepayment account associated with the subscriber, and the system is configured to transfer a predetermined amount of the prepayment account to the mediator unit and to subtract in the mediator unit a sum corresponding to the charging data from the transferred predetermined amount.

27. The system of claim 26, wherein, when the subscriber stops using the service, the system is configured to transfer the remaining from the transferred predetermined amount in the mediator unit back to the prepayment account at the billing unit.

28. The system of claim 26, wherein, when the transferred predetermined amount remaining in the mediator unit is exhausted, the system is configured to transfer a new amount from the prepayment account at the billing unit to the mediator unit or to terminate the service associated with the subscriber if the prepayment account balance at the billing unit is zero or negative.

29. The method of claim 1, wherein the billing unit is located within a home network associated with the subscriber, in a subscriber identity module, or behind an open service architecture connected to the network.

30. The system of claim 15, wherein the billing unit is located in a home network associated with the subscriber or in a subscriber identity module.

31. The system of claim 15, wherein the charging data format is expressed as an amount of money spent or as charging pulses.

32. The billing system of claim 15, wherein the billing unit comprising the subscriber's charging data is located in the subscriber's home network.

33. The billing system of claim 15, wherein the billing unit comprising the subscriber's charging data is located in a subscriber identity module.

34. The billing system of claim 15, wherein the billing unit comprising the subscriber's charging data is located behind an open service architecture connected to the network.

* * * * *